Dec. 30, 1947.            S. C. HURLEY, JR            2,433,560
HOPPER CONTROLLER FOR UNIFORMLY FEEDING UNIT ARTICLES
Filed Oct. 30, 1944
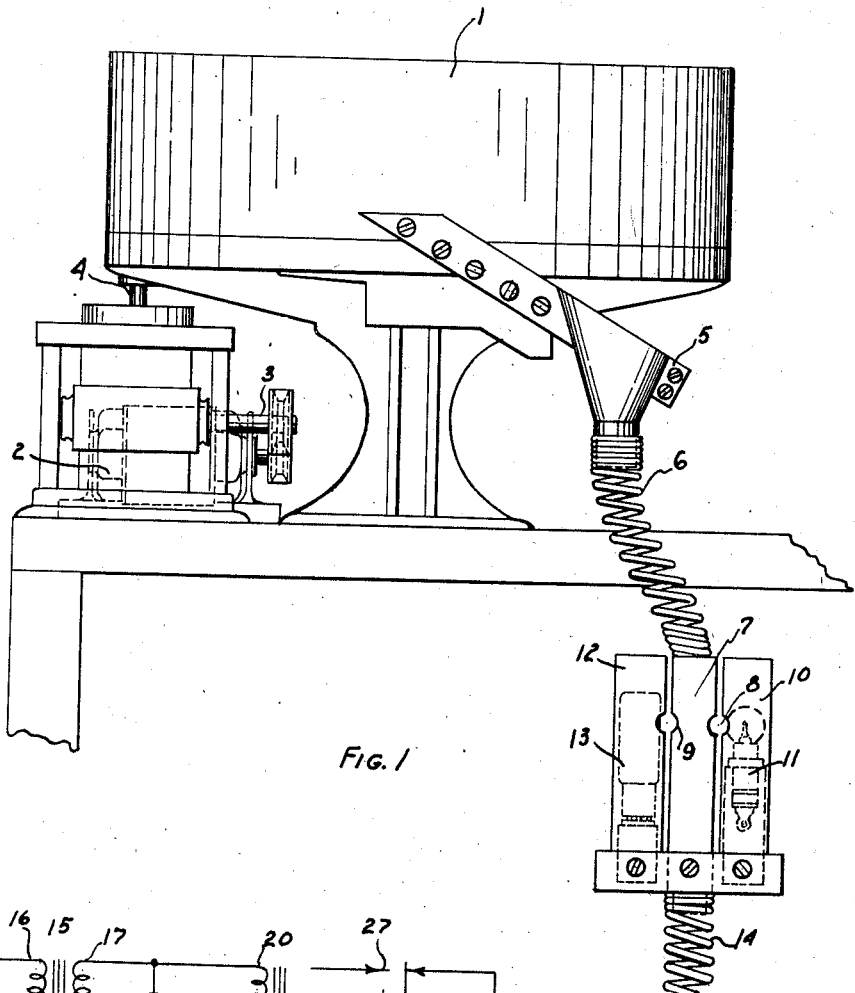
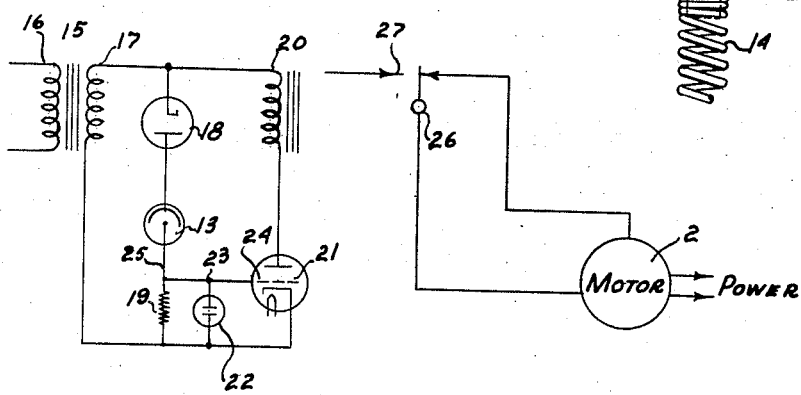
INVENTOR.
SAMUEL C. HURLEY, JR.
BY Benedict & Swartwood
ATTORNEYS Patented Dec. 30, 1947

2,433,560

UNITED STATES PATENT OFFICE 2,433,560

HOPPER CONTROLLER FOR UNIFORMLY FEEDING UNIT ARTICLES

Samuel C. Hurley, Jr., Danville, Ill.

Application October 30, 1944, Serial No. 561,074

1 Claim. (Cl. 222—56)

This invention relates to a hopper controller for use in connection with mechanical hoppers, and particularly to a control for uniformly feeding unit articles.

In operations for feeding unit articles for inspection, fastening or processing operations, it is necessary that the articles be fed uniformly and to insure a constant and steady supply of the articles to the unit operation.

One of the objects of my invention is to provide a hopper controller in connection with a mechanical hopper wherein articles discharged from the hopper are controlled photoelectrically by means of a control conduit attached to the discharge from the hopper as hereinafter described.

It is also an object of my invention to provide a suitable electronic control circuit for controlling the operation of the hopper which is responsive to a photoelectrical device in the control conduit.

Another object of my invention is to provide flexibility in a hopper operation wherein any number of unit articles may be fed per minute to an operation regardless of the size of the hopper.

My invention is particularly useful in controlling hoppers which are used to line up unit articles in a certain direction, as in the case of hoppers for feeding screws to a fastening operation. For inspection of rivets, bullets and other objects larger at one end than the other, it is necessary that the rivets, and the like, be uniformly fed into the inspection operation with either the large end or the smaller end of the rivet entering the inspection operation first. My controller is particularly useful for a hopper which will accomplish this object.

Among the advantages of my hopper controller is that it increases the flexibility of hoppers. It is not always expedient to design hoppers to run continuously for one set of conditions. By the use of my hopper controller, the mechanical hopper may be operated intermittently and a continuous stream of the unit articles will still be insured. My hopper controller obviously has many advantages over camming devices and other mechanical means for obtaining a steady stream of unit articles.

In general, my invention comprises a mechanical hopper which may be of the type which is rotated by a motor, a discharge means from the hopper and a control conduit connected to the discharge means for controlling the operation of the hopper. The control conduit is provided with two ports. Opposite one of the ports and outside of the conduit is located a source of light. Opposite the other port in a separate compartment is located a light sensitive device. The ports and the light sensitive device and the source of light are arranged such that when the supply of unit articles in the control conduit is low, i. e., below the ports, the light sensitive device will be in light and will cause a response in a light sensitive circuit which actuates a relay coil and switch operatively connected with a motor for rotating the hopper. The hopper, even though the phototube is placed in shadow due to the unit articles in the control conduit being above the ports, will continue to feed the unit articles considerably above the ports until a reserve supply of unit articles is accumulated because of a timer incorporated in the electronic control circuit. At that time, the timer will no longer control the relay and the motor will stop and the hopper will no longer feed the unit articles to the control conduit. When the articles fall below the ports, the hopper will again be started. If it were not for the use of the timing device, it is obvious that the photoelectric control system would cause frequent starts and stops of the hopper which would cause chattering. However, by the use of the timing device, the reserve supply can be built up which will accomplish one of the objects of my invention and prevent such chattering.

While any suitable light sensitive circuit embodying the light sensitive device and a proper timer may be used within the objects of my invention, I provide a circuit which is particularly useful in connection herewith. This circuit comprises a source of alternating current with an amplifying tube and a relay coil connected in series across a source of alternating current and connected in parallel with a light sensitive device, connected in series with a resistor, wherein the anode of the phototube is connected to the control electrode of the amplifying tube and to the resistor. The relay coil actuates a relay switch for use in controlling the starting and stopping of the mechanical means for actuating the hopper. In addition, a condenser is also connected between one side of the alternating current and to the anode of the phototube as well as to the control electrode. By this arrangement, when the phototube is in shadow, the control electrode and the cathode of the amplifying tube are at zero potential and the amplifier conducts a current. But when the phototube is in light, current will flow across the phototube when it receives a pulse from the alternating current and the condenser will be charged such that the end of the condenser connected to the control electrode discharges a negative potential which prevents the amplifying tube from conducting. The condenser must be adapted and arranged to hold that charge for at least one-half a cycle of the alternating current which means that with a 60 cycle per second alternating current, the condenser must hold the charge for 1/120 of a second in order to prevent the amplifying tube from conducting when the phototube is in light. By changing the value of the resistor connected in parallel with the condenser which may be accomplished through the usual type of rheostat, an additional charge may be provided on the condenser in order to prevent the relay coil from being actuated which, in turn, keeps the relay switch in closed contact with the motor circuit thus permitting the hopper to continue operation for the desired length of time for building up a reserve supply of articles in the hopper controller and the discharge means from the hopper.

Other objects, advantages and uses of my invention will become apparent by referring to the drawings in which Figure 1 illustrates in elevation, the assembly of the motor, hopper and hopper controller.

Figure 2 illustrates diagrammatically an electronic circuit and its operation in connection with the motor for controlling the hopper.

Referring to Figure 1, 1 illustrates the hopper assembly. The details of the hopper are not shown since hoppers of this type are well known and such details form no part of my invention. A motor 2, with suitable gear reducer 3, is attached to the driving shaft 4 which rotates and operates the hopper. A discharge chute 5 is connected to the outlet of the hopper which feeds unit articles through a flexible wire tube 6 to the control conduit 7. The control conduit 7 contains ports 8 and 9. Compartment 10 houses a source of light 11 shown as an incandescent light, although any suitable source of light may be used. Compartment 12, on the opposite side of conduit 7 from compartment 10, houses a light sensitive device shown as a phototube although a photocell and other types of light sensitive devices may be used. A discharge conduit 14 from the hopper controller is provided to uniformly and continuously feed the unit articles to the operation desired.

Referring to Figure 2, 15 indicates a source of alternating current having a primary coil 16 and a secondary coil 17. Connected in series across the source of alternating current is a rectifier 18, a phototube 13, which is the phototube located in compartment 12 of Figure 1, and resistor 19 which may be of the adjustable type or a rheostat. The rectifier and the phototube are connected such that the anode of the rectifier is connected to the cathode of the phototube and the anode of the phototube is connected to the resistor 19. A relay coil 20 is connected in series with an amplifying tube 21 which may be a thermionic tube of either the vacuum or the gas-filled arc discharge type. The amplifying tube is arranged such that its anode and cathode are reversed to the phototube 13 and rectifier 18 in respect to their connection across the source of alternating current. The condenser 22 is connected to the side of the alternating current to which the resistor 19 is directly connected at point 23 between the control electrode 24 and the anode 25 of the phototube 13. The operation of the circuit illustrated in Figure 2 is as follows:

When phototube 13 is in shadow, which is the case when the reserve supply of unit articles is above the ports 8 and 9 shown in Figure 1, the control electrode 24 is at the same potential as the cathode of the tube 21 and the amplifying tube 21 conducts a current which actuates the relay coil 20 which, in turn, pulls the relay switch 26 into the open position at point 27. When the phototube 13 is in light, current will flow across the phototube during each pulsation of the alternating current at the point 25 which charges the condenser 22 and maintains a negative charge at point 23 which drives the bias of the control grid 24 in a negative direction and prevents the power tube 21 from conducting. The power tube 21 will remain non-conducting as long as the phototube 13 receives light, provided that the condenser 22 receives a sufficient negative charge to maintain the bias negative on the control grid 24, for a sufficient time to at least equal one-half the cycle of the alternating current; otherwise, the bias would not remain negative even though the phototube 13 remained in light and the device would not function. It is apparent that to enable the device to work, the charge on the condenser must be such as to maintain the negative bias on the control grid 24 throughout the time the phototube 13 is in light.

It then becomes apparent that by increasing the resistance of the resistor 19, the condenser 22 can act as a timer to prevent the relay coil 20 from actuating the relay switch 26 in order to permit the motor to continue rotation of the hopper which will feed the unit articles at a point considerably above the ports 8 and 9 of Figure 1 in order to provide a reserve supply.

The amount of charge permitted on the condenser 22 will control the time the motor will continue to rotate the hopper, even though the phototube 13 is in shadow due to the filling up of the control conduit 7 with the unit articles. When the unit articles have been built up in the discharge tube 6 and conduit 7 to the desired level as controlled by the timer, the motor will cease to operate and the hopper will stop feeding articles to the discharge means 5.

As the articles leave conduit 14 they will uniformly continue to feed the unit operation, and when the level of the articles fall below the ports 8 and 9, the phototube 13 will receive light from the light source 11 which will cause a negative bias to be placed on the control electrode 24, the power tube 21 will not conduct and the relay coil 20 will not be actuated. Therefore, the relay switch will be in the closed position as shown in Figure 2 and the motor will actuate the hopper and will continue to actuate the hopper as long as the condenser 22 maintains the negative charge on control grid 24.

The above description of the drawings is intended to be merely illustrative and not to be considered as limiting my invention which is only limited by the following claim.

I claim as my invention:

A hopper controller for feeding unit articles comprising an intermittently operated hopper means for operating said hopper, a discharge means for said articles connected to said hopper comprising a vertically disposed control conduit, means for maintaining a supply of said articles in said control conduit between a lower predetermined level and an upper predetermined level, said latter means comprising a source of light and a light sensitive device positioned at the lower predetermined level with said light sensitive device positioned to receive light from said light source when articles in said control conduit fall below said lower predetermined level, means entirely under the control of said light sensitive device for immediately starting the hopper when said articles fall below said lower predetermined level, means for controlling the operation of the hopper until said control conduit is filled to said upper predetermined level with said unit articles, said last mentioned means comprising a light sensitive circuit including said light sensitive device, a power tube and an electronic timer, a relay switch responsive to said power tube and said electronic timer, said relay switch controlled thereby for the starting of the operation of said hopper in response to said light sensitive device receiving light from said light source when said articles fall below said predetermined level, and said timer through said control of said relay switch continuing the operation of the hopper after the light sensitive device has been placed in shadow by the accumulation of the articles in the control conduit above said lower predetermined level and until said unit articles accumulate in said conduit and discharge means up to the said upper predetermined level at which point said relay switch is actuated such that the operation of said hopper is stopped.

SAMUEL C. HURLEY, Jr.

REFERENCES CITED

The following references are of record in the file of this patent:

UNITED STATES PATENTS

| Number | Name | Date |
| --- | --- | --- |
| 2,301,136 | Moreland | Nov. 3, 1942 |
| 818,585 | Trump | Apr. 24, 1906 |
| 1,435,743 | Salfisberg | Nov. 14, 1922 |
| 2,111,663 | Graemiger | Mar. 22, 1938 |
| 2,259,777 | Politsch | Oct. 21, 1941 |
| 1,031,589 | Russell | July 2, 1912 |
| 2,147,422 | Bendz | Feb. 14, 1939 |